United States Patent
Genova

(10) Patent No.: US 10,532,266 B2
(45) Date of Patent: Jan. 14, 2020

(54) ELECTRONIC WEARABLE INTERACTIVE SPORTS PLAY COMMUNICATION SYSTEM

(71) Applicant: Water Girl, LLC, Huntington Beach, CA (US)

(72) Inventor: Joe Anthony Genova, Huntington Beach, CA (US)

(73) Assignee: Water Girl, LLC, Huntington Beach, CA (US)

(*) Notice: Subject to any disclaimer, the term of this patent is extended or adjusted under 35 U.S.C. 154(b) by 0 days.

(21) Appl. No.: 16/058,659

(22) Filed: Aug. 8, 2018

(65) Prior Publication Data

US 2019/0091545 A1 Mar. 28, 2019

Related U.S. Application Data

(60) Provisional application No. 62/542,696, filed on Aug. 8, 2017.

(51) Int. Cl.
*A63B 71/06* (2006.01)
*H04W 4/12* (2009.01)
*H04B 1/3827* (2015.01)
*H04W 84/18* (2009.01)

(52) U.S. Cl.
CPC ......... *A63B 71/0622* (2013.01); *H04B 1/385* (2013.01); *H04W 4/12* (2013.01); *A63B 2071/0655* (2013.01); *A63B 2071/0663* (2013.01); *A63B 2220/836* (2013.01); *A63B 2225/50* (2013.01); *H04W 84/18* (2013.01)

(58) Field of Classification Search
CPC ...... A63B 71/0622; H04B 1/385; H04W 4/12
USPC ........................................................ 340/7.56
See application file for complete search history.

(56) References Cited

U.S. PATENT DOCUMENTS

| | | |
|---|---|---|
| 6,198,394 B1 | 3/2001 | Jacobsen et al. |
| 7,603,255 B2 | 10/2009 | Case, Jr. et al. |
| 7,825,815 B2 | 11/2010 | Shears et al. |
| 8,231,506 B2 | 7/2012 | Molyneux et al. |
| 8,323,107 B2 | 12/2012 | Amit |
| 8,452,259 B2 | 5/2013 | Ellis et al. |

(Continued)

FOREIGN PATENT DOCUMENTS

| | | |
|---|---|---|
| CN | 203648017 U | 6/2014 |
| WO | WO2015/164944 | 11/2015 |

OTHER PUBLICATIONS

Beast Sensor, https://www.thisisbeast.com/en/product, Beast Technologies S.r.l. © 2014 Via Cairoli 4, 25122 Brescia, Italy P.IVA (VAT): IT-03557770983.

(Continued)

*Primary Examiner* — Kerri L McNally
(74) *Attorney, Agent, or Firm* — Knobbe Martens Olson & Bear, LLP

(57) ABSTRACT

Embodiments disclosed herein include methods and systems for communicating plays or other messages between a coach or other non-player user and a player user during a live sporting event or training session. The system includes a set of wearable devices that are worn by players during a sporting event and a computing node that can be used by the coach to select plays or actions. The plays or other actions selected by the coach can be disseminated to the set of wearable devices enabling one or more players to quickly and accurately determine the play or action to perform.

19 Claims, 10 Drawing Sheets

(56) References Cited

U.S. PATENT DOCUMENTS

| | | | |
|---|---|---|---|
| 8,847,734 B2* | 9/2014 | Ronkainen | H04M 1/72569 340/7.56 |
| 9,317,660 B2 | 4/2016 | Burich et al. | |
| 2006/0189852 A1 | 8/2006 | Greenwald et al. | |
| 2006/0195506 A1* | 8/2006 | Deng | H04L 51/066 709/203 |
| 2007/0021269 A1 | 1/2007 | Shum | |
| 2008/0076637 A1 | 3/2008 | Gilley et al. | |
| 2008/0214903 A1 | 9/2008 | Orbach | |
| 2009/0047645 A1 | 2/2009 | Dibenedetto et al. | |
| 2010/0080390 A1* | 4/2010 | Daniel | A63B 71/06 380/271 |
| 2010/0185398 A1* | 7/2010 | Berns | A41D 13/1281 702/19 |
| 2011/0246579 A1* | 10/2011 | Williams | A63B 71/06 709/206 |
| 2012/0035426 A1 | 2/2012 | Mielcarz et al. | |
| 2012/0223834 A1 | 9/2012 | Hyatt | |
| 2014/0073486 A1 | 3/2014 | Ahmed et al. | |
| 2014/0280581 A1* | 9/2014 | Hernandez | H04L 29/08072 709/204 |
| 2015/0097700 A1 | 4/2015 | Holthouse | |
| 2015/0296353 A1* | 10/2015 | Meyer | H04W 4/14 455/414.4 |
| 2016/0049090 A1 | 2/2016 | Rolih | |
| 2017/0065872 A1* | 3/2017 | Kelley | A63B 71/0622 |

OTHER PUBLICATIONS

Catapult OptimEye S5 Athlete Monitoring System, Catapult Sports, Accessed Dec. 15, 2016 in 5 pages.

Future Wearables Use Your Body to Communicate, Ryan Daws, UC San Diego Jacobs School of Engineering, Sep. 3, 2015, http://www.wearabletechnology-news.com/news/2015/sep/03/future-wearables-use-your-bodycommunicate. in 2 pages.

Viper Pod, Statsports Technologies, GPS Unit, Performance Monitoring Analysis, STATSports,, Accessed Dec. 15, 2016, in 4 pages.

WT, Wearable Technologies Conference, San Francisco, Jul. 25-26, 2017, "News from Wearables for the Super Bowl", Feb. 3, 2017, in 5 pages.

WT, Wearable Technologies Conference, Hong Kong, Oct. 12, 2017, "The Next Generation of Wearables Will Be Soft, Stretchy, Completely Hidden and Very Use Case Specific", Apr. 11, 2017, in 3 pages.

* cited by examiner

ELECTRONIC WEARABLE INTERACTIVE SPORTS PLAY COMMUNICATION SYSTEM

INCORPORATION BY REFERENCE TO ANY PRIORITY APPLICATIONS

This application claims the benefit of priority of U.S. Provisional Patent Application No. 62/542,696, filed on Aug. 8, 2017. The above application is incorporated by reference herein and is to be considered a part of this specification. Any and all applications for which a foreign or domestic priority claims is identified in the Application Data Sheet as filed with the present application are hereby incorporated by reference under 37 CFR 1.57.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION

Overview

Figure 1:
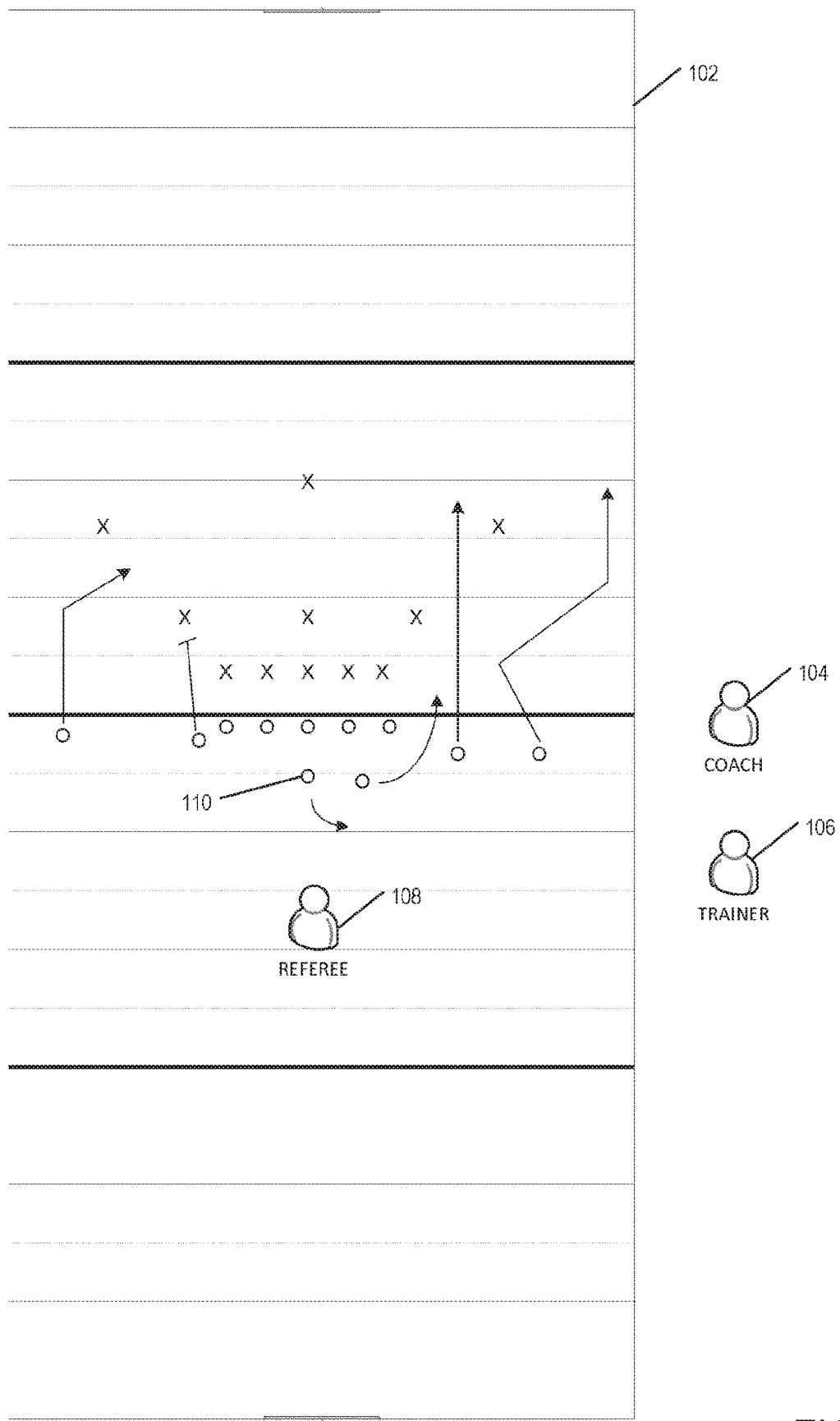
FIG. 1 illustrates one non-limiting example use-case for a sports play communication system.

It is often necessary for a coach or other non-player to communicate with a player or other sports participant during a sporting event. For example, a coach may instruct a player to perform a particular play or take a particular action. For a number of reasons, communication between a player and a coach can be challenging. For example, crowd noise, time constraints, rules regarding whether a coach can be on the field, language barriers, and the like can make communication difficult during a sporting event. These problems are not limited to the sporting event, but may also occur during training sessions. As a result, a player may not receive the instruction from the coach or may misinterpret the instruction resulting in the wrong play or action being performed. Not only can this be detrimental to the game or the team, but in some cases, can also be detrimental to the player's health. For example, if a player believes that one play has been selected, but a teammate believes another play has been selected, the two players may inadvertently harm each other or not adequately protect each other from players on the other team.

Embodiments disclosed herein present a method and system for communicating plays or other messages between a coach or other non-player user and a player user during a live sports event or training session. The system includes a set of wearable devices that are worn by players during a sporting event and a computing node that can be used by the coach to select plays or actions. The plays or other actions selected by the coach can be disseminated to the set of wearable devices enabling one or more players to quickly and accurately determine the play or action to perform. Further, a player can interact with his or her wearable device to acknowledge receipt of the play, to change the play, or to select a play for a set of options provided by the coach. In some embodiments, a player can select a play from a set of options provided by a coach and have the selected play disseminated to other players on the team. For example, a quarterback can select a particular play from a set of plays provided by the coach. The selected play can then be transmitted to the rest of the offense, or a subset of the offence, such as the wide receivers.

As used herein, and unless stated otherwise, the term "coach" in addition to its plain and ordinary meaning may refer to any non-player user who may communicate with a player user. Thus, for example, a coach may include a manager, trainer, instructor, assistant manager, or other user who may instruct a player user or provide a play or action to be performed to a player user. Although typically the coach is separate and distinct from the player users, in some embodiments, the coach may include other players. For example, during training, a more senior player may serve as a de facto coach for less senior players.

As used herein, and unless stated otherwise, the term "sporting event" in addition to its plain and ordinary meaning may refer to any competitive event between players where communication may occur between a coach and a player, or where communication between a coach and player would be beneficial if feasible. Further, in the context of the present disclosure, a sporting event may include any type of training or practice session for the competitive event. Some non-limiting examples of sporting events that can benefit from the system and method disclosed herein include: football games, baseball games, soccer games, hockey games, cheerleading events or competitions, tennis games, surfing competitions, basketball games, gymnastics competitions, dancing competitions, and the like.

Example Use-Case

FIG. 1 illustrates one non-limiting example use-case for a sports play communication system in accordance with certain embodiments described herein. The particular use case illustrated in FIG. 1 relates to a football game. The football game may be an official game play during a season or may be a practice or scrimmage game. Alternatively, the players on the field may be practicing. In the illustrated example use case, players represented by Os and Xs on the field 102 may be preparing to run or execute a play. Assuming the coach 104 is the coach for the team currently on offense, the coach 104 may select a play for the offense, represented by the Os, to perform or execute. The coach 104 may select the play using a computing device, such as a tablet, laptop, or smart phone. This play may be transmitted to wearable devices worn by the offensive players. The offensive players may look at their wearable devices to determine the play selected by the coach 104. Advantageously, in certain embodiments, because the play is transmitted to the wearable devices, the chance of miscommunication between the coach 104 and one or more of the players is reduced. Further, the possibility of some players receiving the identity of the play later than other players on the team is eliminated or reduced.

If the coach 104 desires to change the play after an initial play selection has been transmitted to the players, the coach 104 can select the new play and transmitted to the wearable devices of the players. Further, in some cases the coach 104 may identify multiple plays that may be transmitted to a particular player. For example, the coach 104 may select a set of potential plays to be executed and may send the set of potential plays to a wearable device of the quarterback 110. The quarterback 110 may then select one of the set of potential plays to be performed. Using the wearable device of the quarterback 110, the quarterback 110 can disseminate the selected play to other players on the team. In some cases, a modified version of the play may be transmitted to different players based on the players roll on the team. For example, wide receivers may receive a copy of the play that highlights their routes while offensive linemen may receive a copy of the play that highlights the direction they should attempt to push the defensive linemen or where the offensive linemen should attempt to create running routes between the defensive linemen.

In some embodiments, the coach 104 may delegate certain tasks to other users. For example, continuing the example embodiment illustrated in FIG. 1, the coach 104 may delegate monitoring of player condition to a trainer 106. To delegate the monitoring of player condition to the trainer 106, the coach 104, using the coaches computing device, may authorize a computing device of the trainer 106 to access or receive health metric data obtained from the wearable devices of the players.

Further, in addition to providing a selected play to the players, the coach 104 may provide the selected play to a wearable device of the referee 108. By providing the selected play to the referee 108, the referee 108 can more easily determine where to focus his or her attention during the play. In some embodiments, the referee 108 may be able to block communication between the computing device of the coach 104 and one or more of the wearable devices of the players. By blocking communication between the computing device of the coach 104 and one or more of the wearable devices of the players, a player or coach has been ejected from the game may be prevented from communicating during the game.

As previously stated, FIG. 1 illustrates one non-limiting example use case. Many other use cases are possible relating to many other types of sports. Further, the sports play communication system may provide a number of additional features as will be described further herein.

Example Sports Play Communication System

Figure 2A:
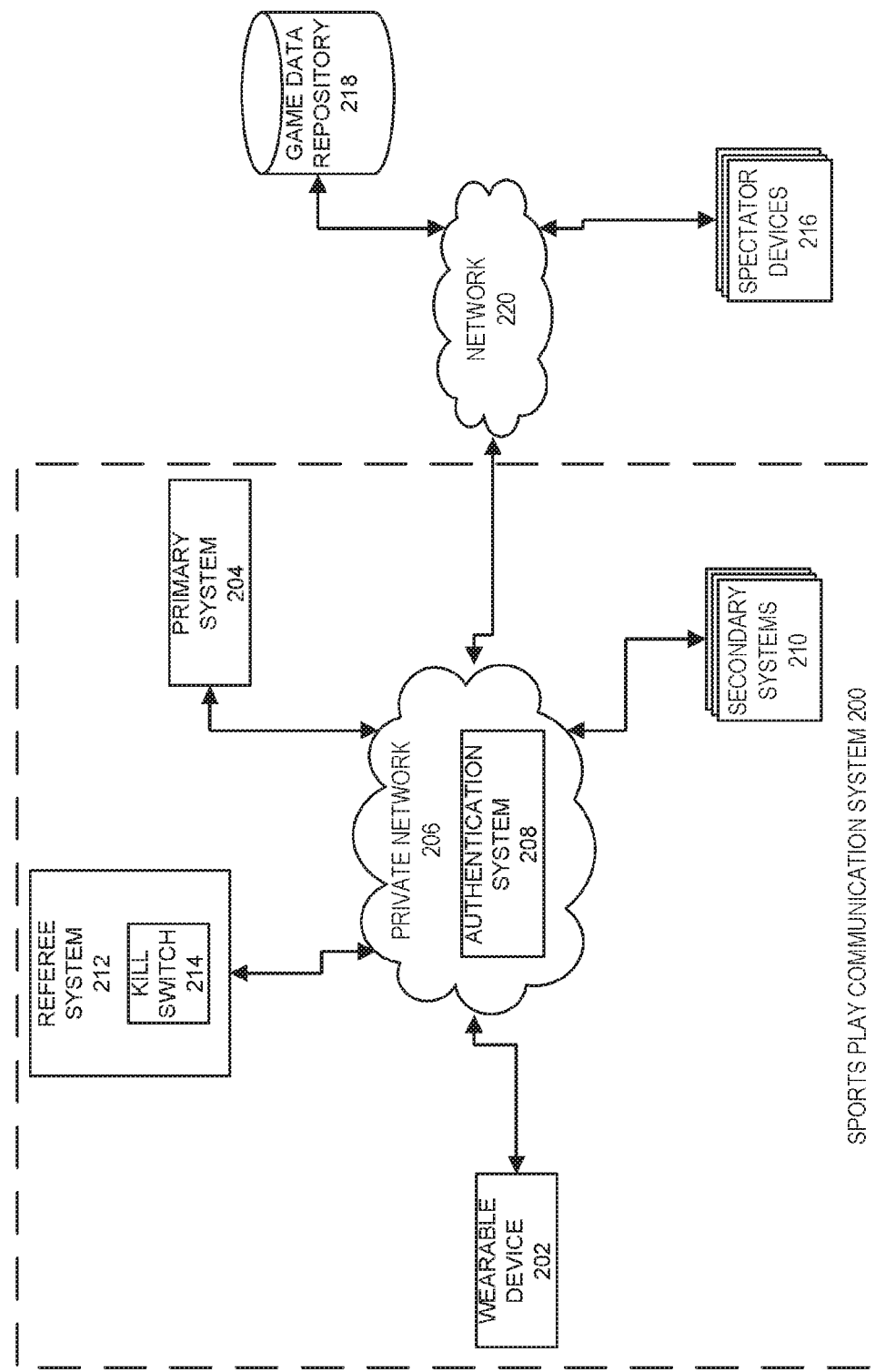
FIG. 2A illustrates an example embodiment of a sports play communication system for interacting with a single player user.

FIG. 2A illustrates an example embodiment of a sports play communication system 200 for interacting with a single player user. The sports play communication system 200 may include a wearable device 202 that may be worn by a player. The wearable device 202 enables the player to receive plays, messages, or instructions to be performed by the player. The player can interact with the wearable device 202 to view the play, to communicate with other players, or to communicate with a coach user who provided the play, the message, or the instruction. Additional details regarding the wearable device 202 and its configuration are described below with respect to FIG. 3.

The play, message, or instruction may be received from a primary system 204. The primary system 204 may be configured to receive a selection of a play, a message, or an instruction to communicate to the wearable device 202 via the private network 206. The primary system 204 may be a user computing system used by a coach, manager, or other advisor or decision-maker that may communicate with the player using or wearing the wearable device 202. The primary system 204 may include any type of computing device that can be used to communicate with a wearable device 202. The private network 206 may include any type of network that separates systems of the sports play communication system 200 from a public network, such as the Internet, and prevents unauthorized access to the wearable device 202 or the primary system 204.

The sports play communication system 200 may further include one or more secondary systems 210. The one or more secondary systems 210 may communicate with the wearable device 202. Further, the one or more secondary systems 210 may access information determined by the wearable device 202. For example, the one or more secondary systems 210 may access sensor data for one or more sensors included in the wearable device 202. In certain embodiments, the primary system 204 may grant the one or more secondary systems to contend with access to the wearable device 202. Thus, in certain embodiments, the primary system 204 may delegate particular features or roles to users of the secondary systems 210. For example, a particular coach may delegate offense of play calling to an offensive coordinator. In such cases, the coach user of the primary system 204 may delegate the selection of plays to a secondary system 210 associated with the offense coordinator. The secondary system 210 associated with the offensive coordinator may transmit the one or more selected plays to the wearable device 202.

The sports play communication system 200 may also include a referee system 212. The referee system 212 may include any system that can receive a selection of a play from a primary system 204. Advantageously, in certain embodiments, by enabling the referee system 212 to receive an identification of the selected play, a referee associated with the referee system 212 can focus on a specific area of the play field on a specific player to enable more accurate refereeing. For example, suppose a selected play is a running play in a football game. In this example, if the referee system 212 receives an indication of the play, the referee associated with the referee system 212 can know to focus on the running back. In some embodiments, the referee system 212 may not receive the same amount of information as the players wearing the wearable device 202. For example, while the wearable device 202 may receive an identity of a specific running play, referee system 212 may receive only an indication that a running play a selected without being informed of the specific running play.

In some embodiments, the referee system 212 may include a kill switch 214 enables a referee associated with the referee system 212 to prevent communication between the primary system 204 and the wearable device 202. In some embodiments the kill switch to 14 may also be used to prevent communication between one or more of secondary systems 210 in the wearable device 202 were between the primary system 204 and one or more of the secondary systems 210. Advantageously, in certain embodiments, the kill switch 214 enables a referee to prevent communication between a user who has been ejected from a sporting event and users who are participating in the sporting event. For example, if a manager of a baseball game has been ejected, the umpire may use the kill switch 214 to prevent the manager from communicating with the baseball players or any of the assistant coaches via the primary system 204. However, if control is been delegated to one of the secondary systems 210, an assistant coach may continue to communicate with the baseball players wearing the wearable device 202.

The sports play communication system 200 can communicate with one or more external devices via a network 220. For example, the sports play communication system 200 can communicate with a game data repository 218. The game data repository 218 can store a set of plays from which a coach can select. For example, the game data repository 218 can store an entire playbook that may have been created by one or more users. The primary system 204 may load the playbook during a sporting event or at some time prior to the sporting event.

Further, the game data repository 218 may store a history of plays selected during one or more sporting events. Advantageously, in certain embodiments, by storing a history of plays selected during a sporting event, one or more coaches can review the history of selected plays and can evaluate the success of each of the selected plays. Using the play selection history and the success evaluation of the selected plays, a coach can determine whether to modify and how to modify a play selection in a subsequent sporting event or may modify how a particular play is run. For example, suppose a tight end is acting as a decoy receiver during a particular running play. A coach may review a history of play selections during one or more sporting events and determine that each time the particular running play is called a defensive back is able to run around the left side of the line and tackle the running back. Based on this analysis the coach may modify the play such that the tight end acts as an additional blocker on the line instead of a decoy receiver.

In some embodiments, other users may access the history of play selections from the game data repository 218 using, for example, the spectator devices 216. For example, a user watching a sporting event may receive an identity of a play selected during the sporting event by the coach. In some embodiments, there is a delay in providing a play selection to the spectator device turns 216 to prevent the user from informing and opposing team of a selected play. In some cases, users observing the sporting event may not be able to access the history a selection until a sporting event is complete to prevent the opposing team from identifying the selected play. In some use cases, users may be able to access a history of selected plays for a sporting event from the game data repository 218 while watching a replay of the sporting event on a spectator device 216, such as a television. In other use cases, the play selection information may be used by spectator devices 216 to enable a user to play a simulated version of the sporting event. For example, a user could play a videogame against an opponent who makes similar or the same play selections as made by the coach during a sporting event. The previous example, a spectator device 216 could access play selection information for the sporting event from the game data repository 218 and use it to configure an instance of a video game.

The private network 206 may include any type of network that enables authorized communication between devices of the sports play communication system 200 while preventing unauthorized users from accessing the systems of the sports play communication system 200 or communications between the systems of the sports play communication system 200. For example, the private network 206 may be an intranet that is accessible by authorized users of the wearable device 202, the primary system 204, the secondary systems 210, or the referee system 212, but that is not accessible by other computing devices, such as the spectator devices 216.

In some embodiments, the private network 206 may include an authentication system 208. The authentication system 208 can include any system that can authenticate a user or system of the sports play communication system 200. Authentication system 208 can prevent an unauthorized user or unauthenticated user, or a device of an unauthorized or unauthenticated user, from communicating via the private network 206 or communicating with other devices within the private network 206, such as the wearable device 202.

Generally, the private network 206 communicates wirelessly with at least some of the devices of the sports play communication system 200. For example, communication between the private network 206 and the wearable device 202 would typically be wireless. It is possible that a player or team and an opposing player or team are both using the sports play communication system 200. In such cases, to prevent the wrong player or team from receiving communication from a coach or other user, each sports play communication system 200 can be configured to use different frequencies for wireless communication. Alternatively, or in addition, each sports play communication system 200 can be configured to use encryption to secure communication between members of a particular team. Further, in some cases, the sports play communication system 200 can be configured to use a particular identifier or label with each data packet or message. In such cases, if the wearable device 202 receives a data packet or message that does not include the anticipated identifier label, wearable device 202 may be configured to discard the message. Thus, wearable devices of an opposing team would automatically ignore a received message and not presented to the opposing players.

The primary system 204 may include hardware and software components for establishing communication with another computing system or system capable of receiving messages from the primary system 204, such as the wearable device 202, over a communication network, such as the private network 206. For example, the primary system 204 may be equipped with networking equipment and network software applications (for example, a web browser) that facilitate communications via a network (for example, the Internet) or an intranet (for example, the private network 206). The primary system 204 may include a number of local computing resources, such as central processing units and architectures, memory, mass storage, graphics processing units, communication network availability and bandwidth, and so forth. Further, the primary system 204 may include any type of computing system. For example, the primary system 204 may include any type of computing device(s), such as desktops, laptops, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few.

The secondary systems 210 may be computing systems and may include one or more of the embodiments described with respect to the primary system 204. For example, secondary systems 210 may include hardware and software components for establishing communication with another computing system. Further, in some cases, secondary systems 210 may be identical to the primary system 204. Alternatively, at least some of the secondary systems 210 may be configured differently than the primary system 204. For example, in one embodiment, the primary system 204 may be a tablet computer, one secondary system 210 may be a smart phone, and another secondary system 210 may be a laptop. Moreover, the referee system 212 may be a computing system and may include one or more of the embodiments described with respect to the primary system 204. For example, the referee system 212 may be a wearable device or a smart phone. In some embodiments, one or more of the primary system 204, the secondary system 210, or the referee system 212 may be an application-specific device created specifically for use with the sports play communication system 200. For example, the primary system 204 may be a specially created computing device configured to select and transmit plays to a wearable device 202.

The spectator devices 216 may include any device that enables a user to receive play selection information or to access play selection information from a game data repository 218. For example, the spectator devices 216 may include any type of computing device(s), such as desktops, laptops, television set-top boxes, video game consoles televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few.

The network 220 can include any type of communication network. For example, the network 220 can include one or more of a wide area network (WAN), a local area network (LAN), a cellular network, an ad hoc network, a satellite network, a wired network, a wireless network, and so forth. Further, in some cases, the network 220 can include the Internet.

Second Example Sports Play Communication System

Figure 2B:
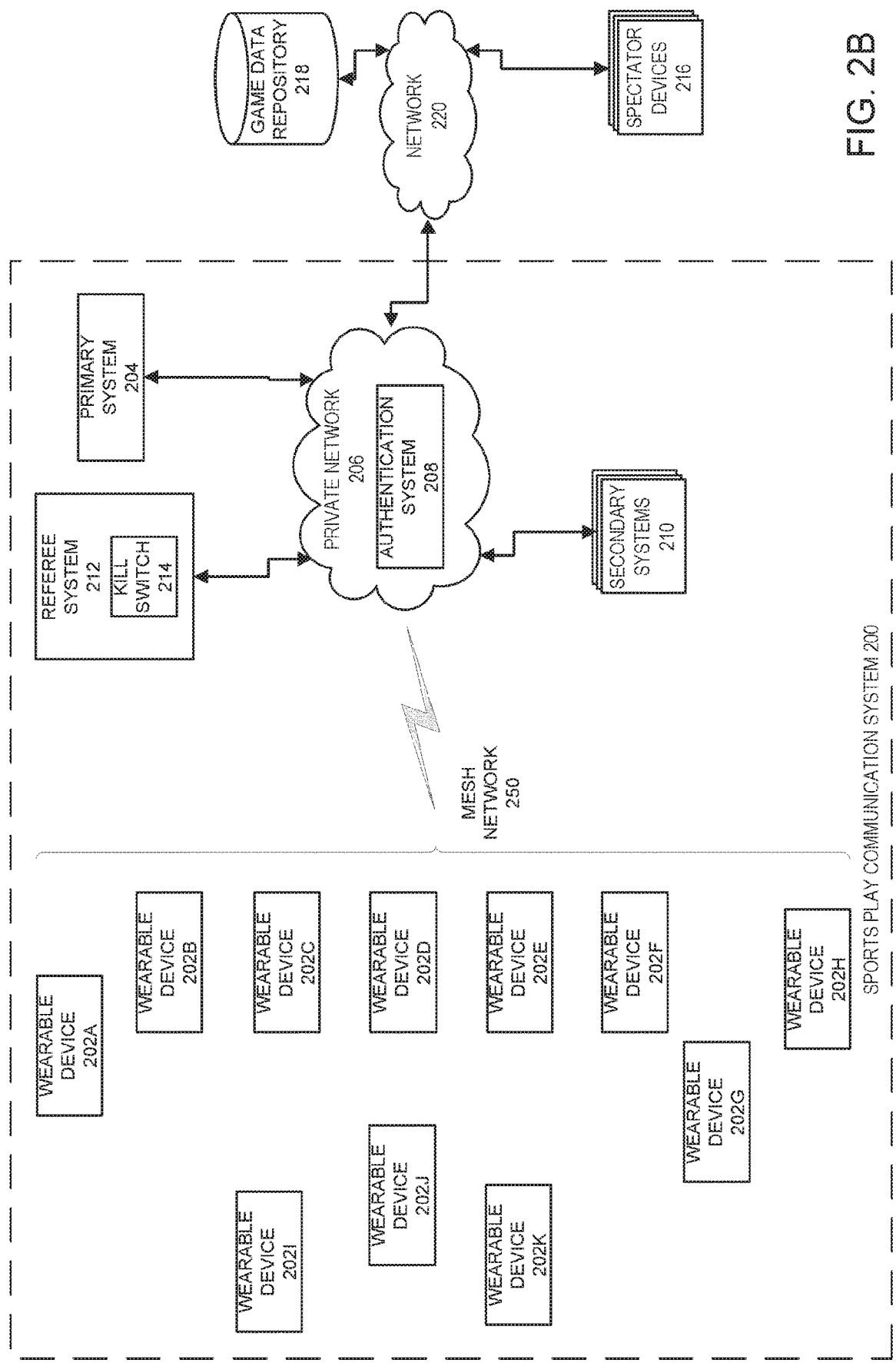
FIG. 2B illustrates an example embodiment of the sports play communication system of FIG. 2A for interacting with a plurality of player users.

FIG. 2B illustrates a modified example embodiment of the sports play communication system 200 of FIG. 2A for interacting with a plurality of player users. As illustrated in FIG. 2B, the sports play communication system 200 may include a plurality of wearable devices 202A-202K. To simplify discussion, the wearable devices 202A-202K may be referred to in the singular as a "wearable device 202" or in the plural as "wearable devices 202."

The plurality of wearable devices 202 may communicate via the private network 206 to one of the other systems, such as the primary system 204, of the sports play communication system 200. In certain embodiments, the private network 206 may include one or more wireless communication devices, such as a wireless router. In some cases, at least some of the wearable devices 202 may be out of communication range from the communication devices of the private network 206. In such cases, the sports play communication system 200 may include a repeater or other device that can retransmit a data packet to a wearable device 202 and that can extend the range of the private network 206.

In some embodiments, the wearable devices 202 may form a mesh network 250. This mesh network 250 may function as an ad hoc network with each wearable device 202 serving as a node within the ad hoc network. Each of, or at least some of, the wearable devices 202 of the mesh network 250 may communicate with other wearable devices 202 of the mesh network 250. Thus, a wearable device 202 that is not within communication range the private network 206 may receive a message, such as a play selection, from the primary system 204 by communicating with other wearable devices 202 within the mesh network 250. For example, suppose that the wearable device 202J is out of communication range from the private network 206 but that the wearable device 202D is within range of the private network 206. Continuing this example, if the user of the primary system 204 selects a play to be performed by a sports team wearing the wearable devices 202, the private network 206 may transmit a message or data packet with the play selection to the wearable device 202D. Wearable device 202D may in turn transmit the message or data packet, or a copy of the message or data packet, to the wearable device 202J.

Further, as an additional example, suppose that the data packet includes an audible option for the selected play. If the user of the wearable device 202J is the quarterback and the quarterback determines to audible, or to change to an alternative play, the wearable device 202J may transmit a data packet to the other wearable devices 202 with the selection of the audible or alternative play. Moreover, at least one of the wearable devices, such as the wearable device 202D, may transmit a copy of the data packet to the primary system 204 via the primary network 206. Thus, the coach may be made aware that the quarterback has elected to perform the alternative play.

Example Wireless Device

Figure 3:
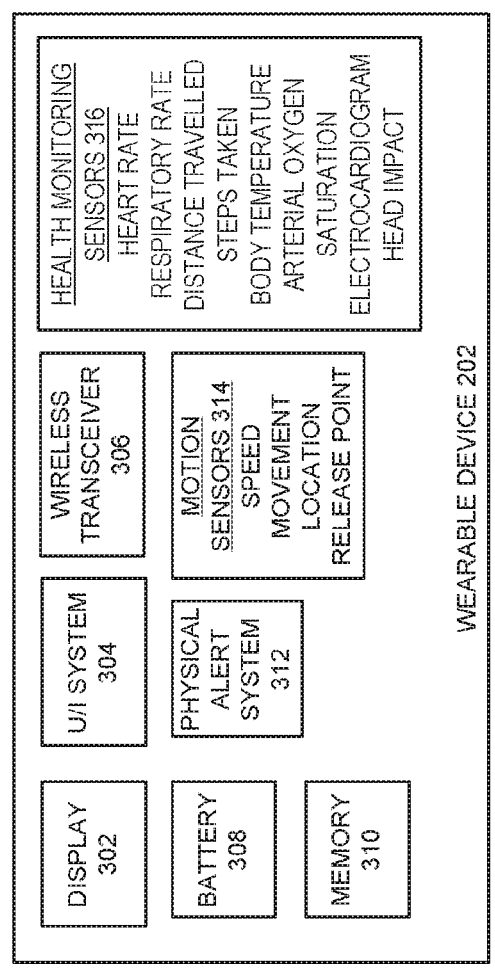
FIG. 3 illustrates an example embodiment of a wearable device.

FIG. 3 illustrates an example embodiment of a wearable device 202. The wearable device 202 illustrated in FIG. 3 is one non-limiting example of a wearable device 202 that may be used with the sports play communication system 200 of the previous figures. In some embodiments, the wearable device 202 may include more or fewer elements than those depicted in the example embodiment of FIG. 3. For example, the wearable device 202 may include more or fewer sensors than indicated by the health monitoring sensors 316.

The wearable device 202 may include a display 302, a user interface system 304, a wireless transceiver 306, a battery 308, memory 310 (which may include volatile memory, nonvolatile memory, or both volatile and nonvolatile memory), a physical alert system 312, one or more motion sensors 314, and one or more health monitoring sensors 316. The display 302 may include any type of display that can display a message to a user of the wearable device 202. The display 302 may be capable of displaying text, an image, an animated image, or a video to the user. For example, the display 302 may present to a player user an image of a play to be performed. In some cases, the display 302 may present an animated image or a video illustrating the play the users to perform. In some embodiments, different wearable devices 202 may present different images, or other output, to different users based on their role on the team. For example, a wide receiver may be presented with an animated image illustrating a route for the wide receiver to traverse during the play while an offensive lineman may be presented with an animated image illustrating the defensive player the offensive lineman is to block. In some cases, text may be presented on the wearable device 202 in addition to or instead of the image. The text may identify an action or play to perform or may identify a role of a user to be performed during the play. For example, a tight end may receive a particular play and may receive text informing the tight end and whether he or she should block an edge rusher or get open to catch the football.

In some embodiments, the display 302 may be a touch-capable display, such as a touchscreen. The user may interact with the touchscreen to select a play, acknowledge receipt of the play, or otherwise communicate with the primary system 204 or other wearable devices 202. The touchscreen can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display.

The user interface system 304 may include any system capable of generating a user interface to present a play or other message to a user. Further, the user interface system 304 may include a system capable of receiving input from a user. For example, user interface system 304 may receive touch inputs via a touchscreen display 302 indicating, for example, that the user acknowledges receiving the play. In other cases, the user may interact with the user interface 304 to cause a video to play or run of the selected play to be performed by the user.

The wireless transceiver 306 may include any type of communication system capable of receiving or transmitting data packets to another system within the sports play communication system 200. The wireless transceiver 306 may be capable of communicating with other wearable devices 202, systems of the private network 206, or other computing systems, such as the primary system 204. Further, the wireless transceiver 306 may be capable of communicating using a number of wireless standards. For example, the wireless transceiver 306 may communicate using one or more of the IEEE 802.11 standards, Wi-Fi, Bluetooth, BLE, LoRa, ZigBee, or any other wireless communication technology.

The battery 308 may include any type of portable power supply. The battery 308 may be a rechargeable battery. In some cases, the battery 308 may be recharged through motion, such as movement from the player user wearing the wearable device 202.

The memory 310 may include volatile memory, such as random-access memory (RAM). Further, in some embodiments, the memory 310 may include non-volatile memory, such as a solid state drive (SSD) or other flash memory device.

In some embodiments, the wearable device 202 may include physical alert system 312. The physical alert system 312 may be configured to alert the user when a message is received. This alert may be a vibration or other tactile feedback. When the play selection is received at the wearable device 202, the physical alert system 312 may alert the user that the play has been received that the user should look at the display 302. In some embodiments, the physical alert provided by the physical alert system 312 may differ based on the type of message received. For example, the physical alert system 312 may differ based on the type of action to be performed on the direction in which the user should move. For instance, if the coach desires for a soccer player to pass the ball to the left back, the physical alert system 312 may buzz or vibrate on the left side of the players arm or wrist that is wearing the wearable device 202. If on the other hand the coach desires for the soccer player to pass the ball to the right back, the physical alert system 312 may buzz or vibrate on the right side of the players arm or wrist that is wearing the wearable device 202.

In some embodiments, the wearable device 202 or portions thereof may be distributed among different body parts of the user. Thus, a physical alert system 312 may include a pair, or more, of tactile devices. One tactile device may be worn on the left arm of the player and one tactile device may be worn on the right arm of the player. Continuing the previous example, the left tactile device may vibrate if the coach desires to player to move left in the right tactile device may vibrate if the coach desires the player to move right.

The motion sensors 314 may include one or more sensors for detecting movement of the player user wearing the wearable device 202. The one or more motion sensors 314 may include sensors for detecting speed of movement, location of movement, the occurrence of movement, or a release point of a thrown item, such as a ball or javelin.

The health monitoring sensors 316 may include one or more sensors per determining various health metrics of the player user wearing the wearable device 202. The one or more health monitoring sensors 316 may include sensors for detecting heart rate, respiratory rate, travel distance, steps taken, body temperature, arterial oxygen saturation, electrocardiogram (ECG) readings, or the occurrence of head impact. Advantageously, in certain embodiments, by monitoring the player's health during the performance of the sporting event, injuries to players can be reduced.

Although the wireless device 202 is illustrated as a single system, it should be understood that in some embodiments the wireless device 202 may include multiple elements that may communicate with each other, but which may be distributed around the player's body. For example, in some embodiments, one or more of the sensors 316 may include a plurality of sensor elements that are distributed around the player user's body.

The wearable device 202 may be configured to be worn on one or more different elements of the player's body. For example, the wearable device 202 may include a band that can be used to affix or position the wearable device 202 with respect to the player's body. Thus, at least portions of the wearable device 202 may be worn around the player's wrist, around the player's arm, around the player's ankle, or other locations of the player's body.

In some embodiments, the wearable device 202 may include flexible circuitry and/or a flexible display that enables the wearable device 202 to be worn around a portion of a player's body during a sporting event. Further, the flexible circuitry enables the wearable device 202 to be made from non-rigid or soft material reducing or preventing harm to other the user or other players when contact occurs between players and the wearable device 202. For example, the wearable device 202 may have a neoprene band and a soft plastic screen. In some embodiments, the wearable device 202 may be a modified smartwatch.

Example Action Distribution Process

Figure 4:
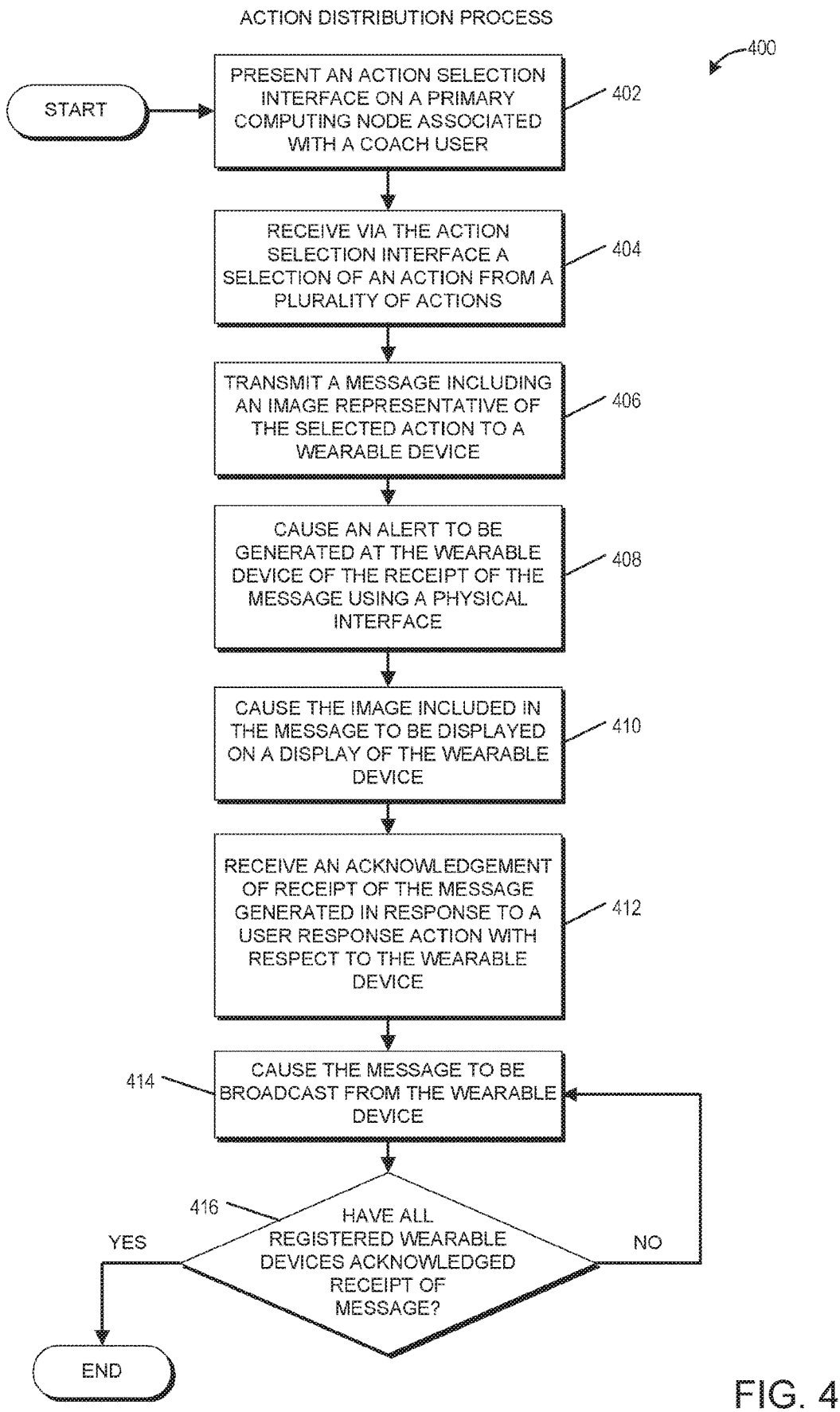
FIG. 4 presents a flowchart of an example embodiment of an action distribution process.

FIG. 4 presents a flowchart of an example embodiment of an action distribution process 400. The process 400 can be implemented by any system that can transmit or distribute a selected action or play from a computing node of a user, such as a coach, to a wearable device of a player user participating in a sporting event or training for sporting event. The process 400, in whole or in part, can be implemented by, for example, a sports play communication system 200, a primary system 204, a secondary system 210, or wearable device 202, among others. Although any number of systems, in whole or in part, can implement the process 400, to simplify discussion, the process 400 will be described with respect to particular systems.

The process 400 begins at block 402 where an action selection interface is presented on a primary computing node associated with the coach user. The primary computing node may be the primary system 204. However, in some embodiments, the primary computing node may be a secondary system 210. For example, in embodiments where the coach or head coach has delegated play selection responsibility to an assistant coach, such as an offensive coordinator, a secondary system 210 associated with the offensive coordinator may be configured to present the action selection interface to the offensive coordinator. The action selection interface may include any interface for selecting a play or action to be performed by one or more players during the sporting event. The sporting event may be a live or competitive sporting event, or the sporting event may be training for a live or competitive sporting event.

At block 404, a selection of an action from a plurality of actions is received via the action selection interface. The selection of the action may be received at the primary system 204 or a secondary system 210 in response to a user's interaction with the action selection interface presented by the primary system 204 or the secondary system 210. In some embodiments, the block 404 may include receiving the selection of multiple actions or plays. For example, a coach may select a plurality of plays to provide the players with options for the play to be performed. In some cases, a preference or priority may be associated with each of the selected plays from the plurality of plays. For example, the coach or offensive coordinator may select a particular play to be performed, and one or two alternative plays. The selected play to be performed may be associated with a higher priority than the alternative plays. When the identity of the plurality of plays is transmitted to a wearable device 202 of the player user, the priority of each of the plays affect the order in which the plays are presented to the user and/or an emphasis, such as highlighting or a ranking, used to indicate the coach is preferred play versus the audible or alternative plays. In some cases, the primary play may be identified as such and the audible plays may be identified as such when presented to the player user.

At block 406, the primary system 204 transmits the message including an image representative of the selected action to a wearable device 202. The image may be a static image illustrating the play to be performed or maybe an animated image. In some embodiments, different portions of the image may be animated based on the role of the player associated with the wearable device 202 that receives the message. For example, a first portion of the image may be animated for a wide receiver, and a second portion of the image may be animated for a running back to make it easier for the respective players to determine their actions or routes within the play. In some embodiments, the message may include text in addition to or instead of the image. The text may state the play to be performed by the user receiving the message at the wearable device 202. Moreover, in some embodiments, the message may include a video instead of or in addition to the image. The video may illustrate the action to be performed by the player.

In some embodiments, the message may include a series of images illustrating different components of an action or different actions in a series of actions. In some such embodiments, the wearable device 202 may determine whether a user has completed the component of the action or one of the actions in the series of actions using, for example, the motion sensors 314. Different images in the series of images may be presented to the user as the user completes the different components of the action or an action in the series of actions. Thus for example if the series of images represent a dance or martial arts routine, the images displayed on the wearable device 202 may change your progress as the wearable device 202 determines that the user is completed different portions of the routine. In order to enable the wearable device 202 to determine that the user has completed different portions of the routine, the message may include a set of motion data values that can be compared against data collected by the motion sensors 314. If it is determined that motion data values corresponding to a first image in the routine matches data collected by the motion sensors 314, the wearable device 202 may transition a first image to a second image representing the next action within the routine.

At block 408, an alert is generated at the wearable device 202 responsive to receipt of the message. This alert may be generated using a physical interface, such as the physical alert system 312. The alert may be a buzz or vibration indicating that the wearable device 202 has received a message with a play selection. By buzzing or vibrating the user, the user may be made aware that a play selection has been received and should you the display 302 to determine the play selected by the coach. In some embodiments, the buzzer vibration may be located at a particular portion of the wearable device 202 providing the user with additional information about an action. For example, based on the direction of the vibration with respect to the wearable device 202, the user may determine the direction in which to run during the play. Further, the number intensity of buzzes or vibrations may also provide information about actions to be performed. For example, a wide receiver may determine his or her role within a play based on the number of buzzes performed by the wearable device 202. For instance, if one or two buzzes are received, the wide receiver may determine that he or she is running one of two outside routes. However, if a third buzz is received, the wide receiver may determine that he or she is running a slot route as a slot receiver or inside wide receiver.

At block 410, the image included in the message is displayed on a display 302 of the wearable device 202. The block 410 may include displaying an animated image or video instead of or in addition to the image. The image may be representative of the action to be performed by the user during a play.

At block 412, the primary system 204 receives an acknowledgment of receipt of the message generated in response to a user response action with respect to the wearable device 202. The knowledge meant may be generated in response to a user interacting with the display 302. For example, the user may tap the display 302 or interact with a button on the display 302 to indicate that the user has received or viewed in image corresponding to the selected play included in the message.

Optionally, in certain embodiments, the message may be broadcast from the wearable device 202 at block 414. Broadcasting the message from the wearable device 202 may enable other wearable devices to receive the message, or a copy of the message, transmitted by the primary system 204 to the wearable device 202. In some embodiments, the wearable device 202 may be assigned or configured to transmit the message received from the primary system 204 to a second wearable device. Alternatively, or in addition, the wearable device 202 may be configured to transmit the message to devices that are more than a threshold distance from the primary system 204 or from the private network 206. In some embodiments, the wearable device 202 may rebroadcast the message enabling any wearable device within range of the wearable device 202 to receive the message. In some embodiments, the message is encrypted. In some such cases, only authorize wearable devices may include a key for decrypting the message. In some embodiments, data packets of the message may be associated with a particular code. In some such cases, wearable devices not associated with the code may ignore or discard data packets of the message.

At decision block 416, it is determined whether all of the registered wearable devices 202 have acknowledged receipt of the message. If it is determined that all of the registered wearable devices 202 have acknowledged receipt of the message, the process 400 may end or may be repeated in response to the selection of a new action or play to be performed. If it is determined that not all of the registered wearable devices have acknowledged receipt of the message, the message may continue to be broadcast or may be rebroadcast by the primary system 204 or a wearable device 202 that has received the message.

In some embodiments, the message may cease being broadcast regardless of whether some or all registered wearable devices 202 have acknowledged receipt of the message. For example, a time to live value may be associated with the message. When the time to live value is satisfied, the primary system 204 or a wearable device 202 that has received the message may cease rebroadcasting the message. In some embodiments, the time to live value may be associated with or correlated with a particular clock or count down within the sporting event. For example, the time to live value may correspond to a play clock within a football game.

In some embodiments, when all or certain registered wearable devices 202 have acknowledged receipt of the message, a particular wearable device 202 may receive an additional message or may buzz to indicate that all or certain registered wearable device 202 have acknowledged receipt of the message. For example, once all of the players on a football team, or all of the non-linemen have acknowledged receipt of a message including a play selection, a quarterback's wearable device 202 may buzz again or buzz in a particular way to inform that quarterback that the players have acknowledged the play. The quarterback can then lineup or initiate the play.

Example Tiered Communication Process

Figure 5:
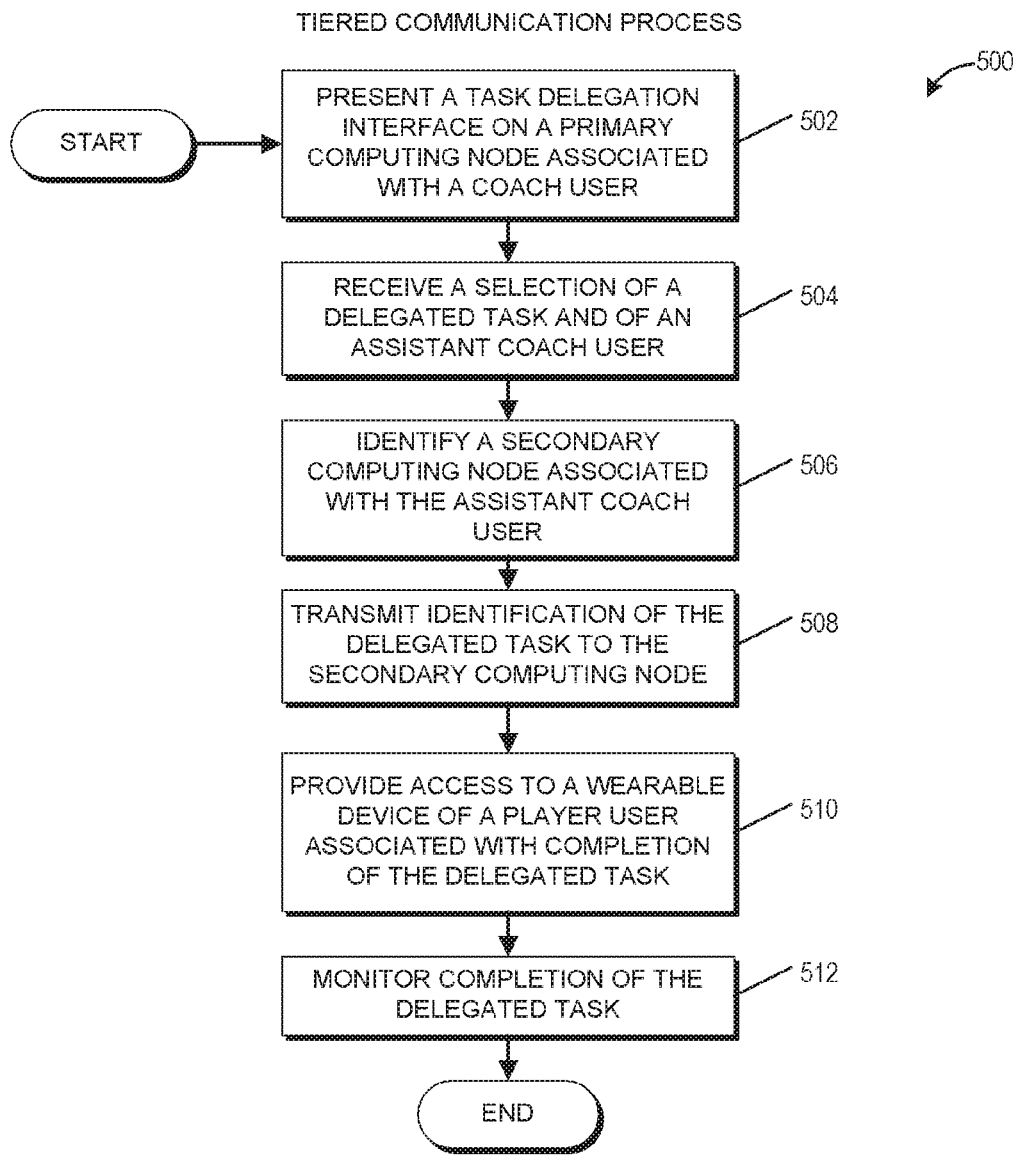
FIG. 5 presents a flowchart of an example embodiment of a tiered communication process.

FIG. 5 presents a flowchart of an example embodiment of a tiered communication process 500. The process 500 can be implemented by any system that can delegate tasks with respect to interaction with a set of worn by one or more player users participating in a sporting event or training for sporting event. The process 500, in whole or in part, can be implemented by, for example, a sports play communication system 200, a primary system 204, a secondary system 210, or wearable device 202, among others. Although any number of systems, in whole or in part, can implement the process 500, to simplify discussion, the process 500 will be described with respect to particular systems.

The process 500 begins at block 502 where a task delegation interface is presented on a primary computing node, such as the primary system 204, associated with a coach user. The task delegation interface include user interface that enables the coach user to delegate particular sports related tasks to another user, such as an assistant coach. These tasks may include training of player users, health monitoring of player users, play selection for particular player users within a team, supervision of the subset of player users, or any other sports related task or role like me delegated by the coach to another user.

At block 504, the primary system 204 receives a selection of a delegated task and of an assistant coach user. In some embodiments, in addition to or as an alternative to receiving a selection of the assistant coach user, a selection of another user associated with the team may be received. For example, medical personnel associated with the team may be delegated tasks relating to monitoring the health of players during a sporting event. For instance, medical personnel may be delegated with the task of monitoring players for concussion.

At block 506, the primary system 204 identifies a secondary computing node associated with the assistant coach user. The secondary computing node may be a secondary system 210. The secondary computing node associated with the assistant coach user, or other user designated at the block 504, may be determined by accessing a data structure that indicates the association of computing nodes within the sports play communication system 200 and users of the sports play communication system 200. For example, the data structure may indicate which secondary systems 210 are associated with particular assistant coach users. In some embodiments, the data structure may be stored at a repository associated with the sports play communication system 200. In some cases, the coach user may specify the secondary system 210 associated with the assistant coach user at the block 506.

At block 508, the primary system 204 transmits an identification of the delegated task to the secondary computing node identified at the block 506. Transmitting the identification of the delegated task to the secondary computing node may include providing the secondary system 210 associated with the assistant coach user with access to data or information that may be required or helpful to complete the task assigned to the assistant coach user. Further, the identification of the delegated task may include instructions for the assistant coach user regarding the task to be completed. For example, the identification of the delegated task may include informing the assistant coach user that he or she is to train a subset of player users in performing particular actions. Further, information received with the identification of the delegated task may include an identity of the subset of player users, the actions to be performed by the subset of player users, and identity of wearable devices 202 associated with the subset of player users, and the like.

At block 510, the primary system 204 provides access to a wearable device 202 of a player user associated with completion of the delegated task. Providing access to the wearable device 202 of a player user associated with the delegated task may include authorizing the secondary system 210 to communicate with the wearable device 202. For example, the secondary system 210 may be authorized to access sensor information of the wearable device 202. As another example, the secondary system 210 may be authorized to transmit messages to the wearable device 202, such as plays or actions to be performed by the wearer of the wearable device 202.

At block 512, the primary system 204 monitors completion of the delegated task. Monitoring completion of the delegated task may include accessing status information from the secondary system 210. In some embodiments, the status information may automatically be derived based on actions performed by the secondary system 210 or sensor information access from the wearable device 202. For example, the secondary system 210 may log or otherwise track messages provided to the wearable devices 202. Based on the messages by the wearable device 202, secondary system 210 can determine whether player users are performing particular actions. Further, accessing sensor information from the wearable device 202, the secondary system 210 can determine the performance or the level of performance of particular actions performed by the player user associated with the wearable device 202. Further, the secondary system 210 can monitor the health of the player user wearing the wearable device 202 by accessing health data metrics measured by the health monitoring sensors 316. The generated status information may be provided by the secondary system 210 to the primary system 204 to facilitate monitoring completion of the delegated task. In some embodiments, the block 512 may be optional or omitted.

In certain embodiments, the process 500 can be repeated in a hierarchical fashion. For example, the assistant coach user identified at the block 504, can delegate additional tasks or portions of the task delegated to the assistant coach user to other users. For example, suppose that training of the offense of the football team is delegated to the offensive coordinator. The offensive coordinator may delegate training of the quarterback to a quarterbacks coach, training of the wide receivers to a wide receivers coach, and training of the running backs to running backs coach. Further, offensive coordinator may delegate health monitoring of the players to one or more medical personnel. Each of the delegations may be accomplished by performing at least portions of embodiments of the process 500.

Advantageously, in certain embodiments, the process 500 enables tiered communication. The coach user can delegate particular tasks relating to the training or coaching of player users during a sporting event or preparation for sporting event. Users that have been delegated the particular tasks can in turn further delegate at least portions of the tasks to other users. The coach user or other users can monitor the completion of the particular tasks based on the communications between the primary system 204, the secondary systems 210 in the wearable devices 202.

Example User Interfaces

FIGS. 6A-6J present a set of non-limiting examples of user interfaces for the sports play communication system 200. It should be understood that other user interfaces are possible including additional user interfaces for additional features and alternative user interfaces.

Figure 6A:
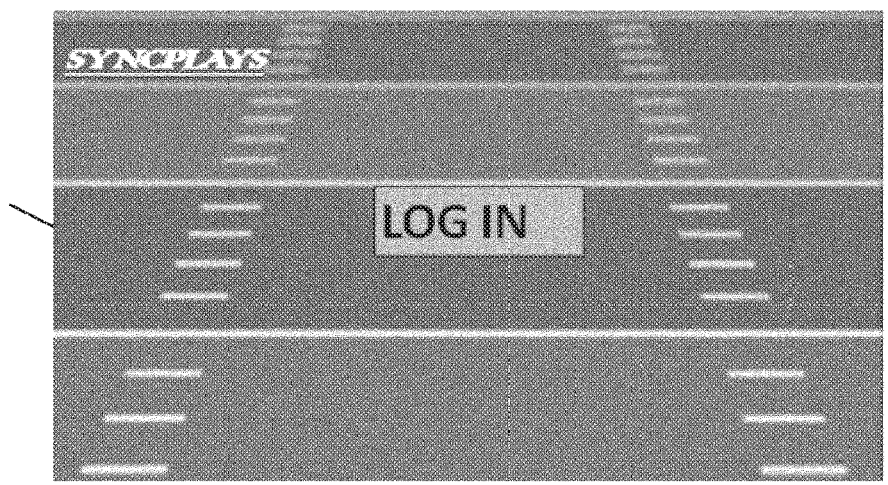
FIGS. 6A-6J present a set of non-limiting examples of user interfaces for the sports play communication system.

FIG. 6A illustrates a splash screen 600 that may be presented at the primary system 204 or one or more secondary systems 210 enabling coach users to access the play communication system 200. In some embodiments, player users may login to the wearable device 202 by accessing the splash screen 600 on a wearable device 202.

Figure 6B:
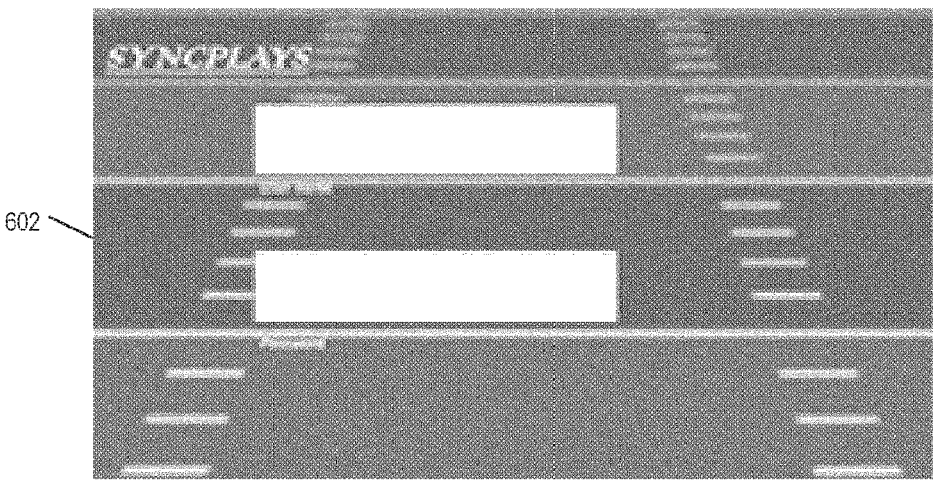

FIG. 6B illustrates a login user interface 602 that may be presented to users of the primary system 204, secondary systems 210, or the wearable devices 202. As illustrated, the user may provide a username and password to authenticate themselves to the sports play communication system 200. In addition to authenticating identity of the user accessing a system within the sports play communication system 200, it may be determined whether the user is authorized to access a particular system. For example, a player user may be successfully authenticated and authorized to access a wearable device 202. However, if the player user enters his or her authentication information at the primary system 204, the player user may be denied access unless the coach user has delegated a particular task to the player user that includes accessing the primary system 204.

Figure 6C:
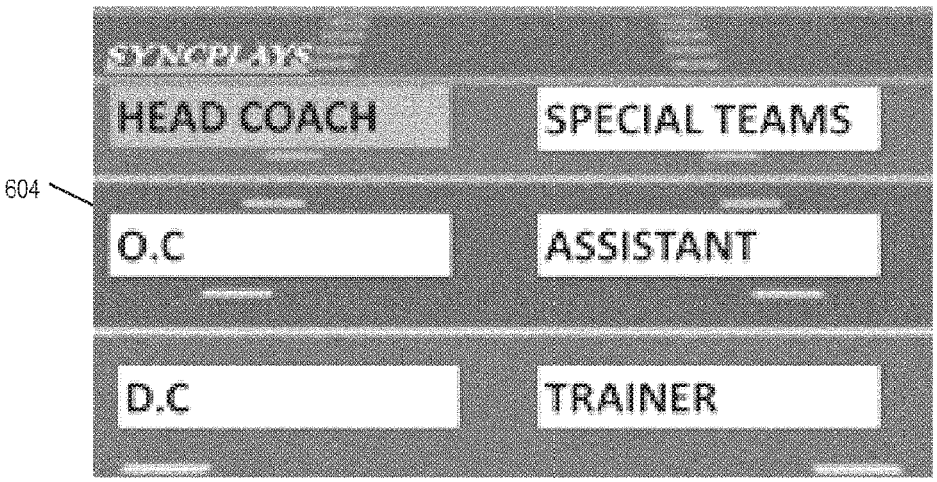

FIG. 6C illustrates a role selection screen 604. The role selection screen 604 enables a user, such as a coach user, to access different tasks associated with different roles of the user. In some embodiments, a subset of roles may be accessible based on authentication of the user. For example, an assistant head coach may have access to each of the roles illustrated on the role selection screen 604 with the exception of the head coach role. Thus, as illustrated, the head coach role may be grayed out or otherwise differentiated from the roles that the user is authorized to access. In some embodiments, the role selection screen 604 displays only the roles the user is authorized to access. For example, an offense of coordinator may only be presented with the offensive coordinator option on the role selection screen 604. Alternatively, a user may be presented with his or her role and any subordinate role. Thus, an offensive coordinator may have access to the offensive coordinator tasks as well as any tasks that may be delegated to other offensive personnel who report to or are otherwise subordinate to the offensive coordinator.

Figure 6D:
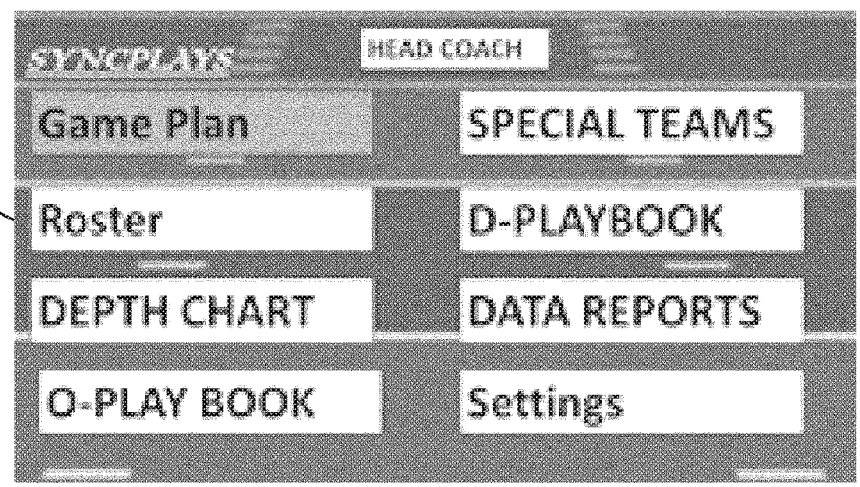

FIG. 6D illustrates a task selection screen 606. The particular task selection screen 606 is for the head coach. Via the task selection screen 606, the head coach can select particular tasks to perform as well as data collected by the wearable devices 202 or the sports play communication system 200. In the particular illustrated example, the coach user has selected the game plan task.

Figure 6E:
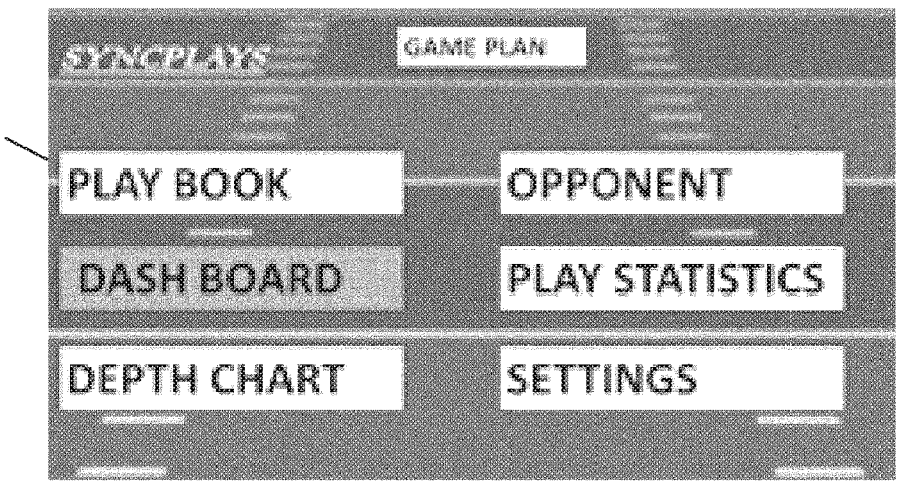

FIG. 6E illustrates a sub task selection screen 608. The sub task selection screen 608 provides access to different task options related to the tasks selected via the task selection screen 606. For example, when the head coach selects the game plan task option in the selection screen 606, the coach is provided with access to playbook information, opponent information, play statistics, and the like at the sub task selection screen 608.

Figure 6F:
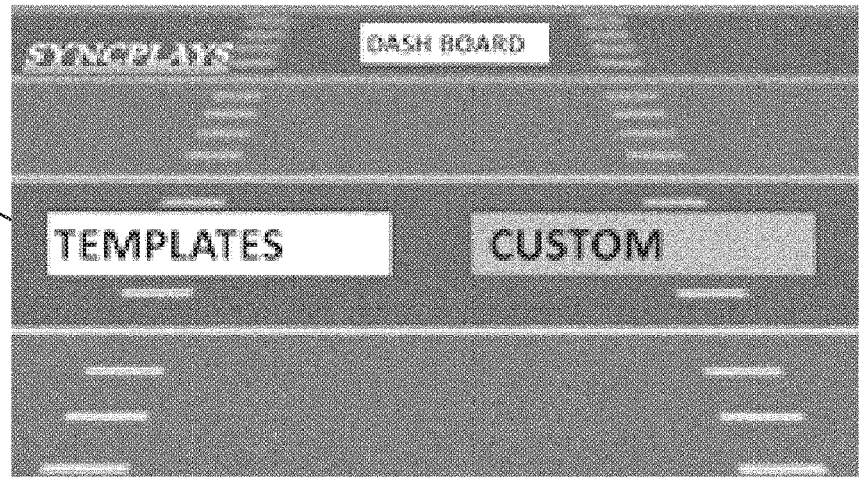

FIG. 6F illustrates a configuration screen 610. Via the configuration screen 610, a user can modify the configuration of the user interface presented by the user interface system 304 of the wearable device 202 or a user interface of the primary system 204 or secondary system 210. For example, the user can select from one or more templates available for displaying different options to the user regarding play selection, health monitoring, opponent information, and additional sports related information. Further, the user can customize or create new templates for the user interface of the wearable device 202, the primary system 204, or the secondary system 210. Moreover, a user can configure the interface of the referee system 212 to modify the type of information provided to the referee.

Figure 6G:
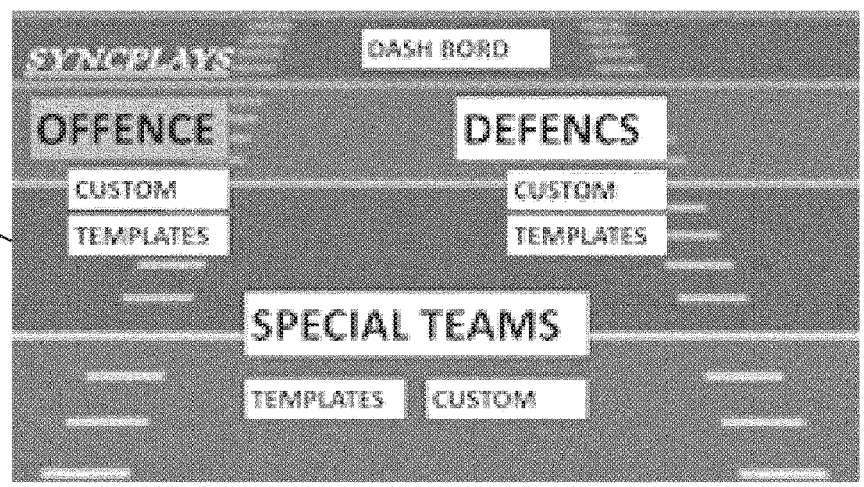

FIG. 6G illustrates a configuration sub screen 612. Using the configuration sub screen 612, a user can configure a user interface for displaying different types and numbers of plays to a user and a wearable device 202.

Figure 6H:
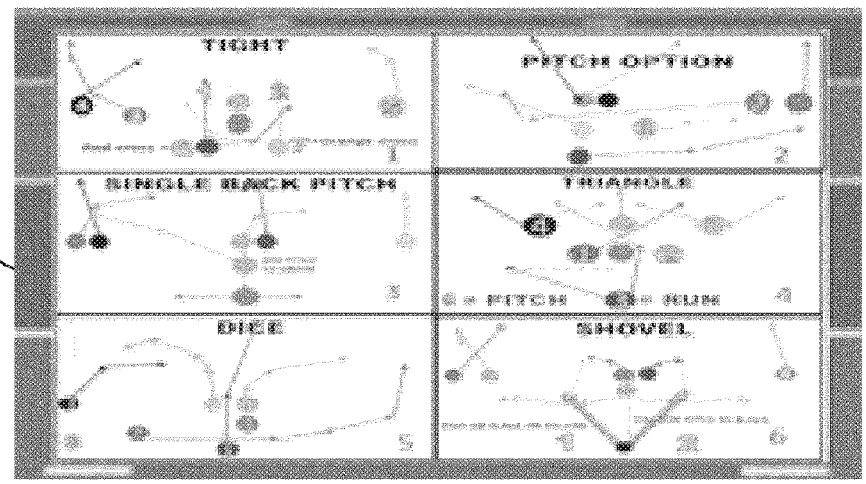

FIG. 6H illustrates an example play selection screen 614. Using the play selection screen 614, a user can select a play to transmit to the wearable device 202. In some embodiments, a user can select multiple plays from the play selection screen 614 two transmit to the wearable device 202. For example, the user can select a desired play and a backup play that the quarterback can select based on his read of the defense. The desert play in the backup play can be transmitted to the wearable device 2021 selection from the play selection screen 614.

Figure 6I:
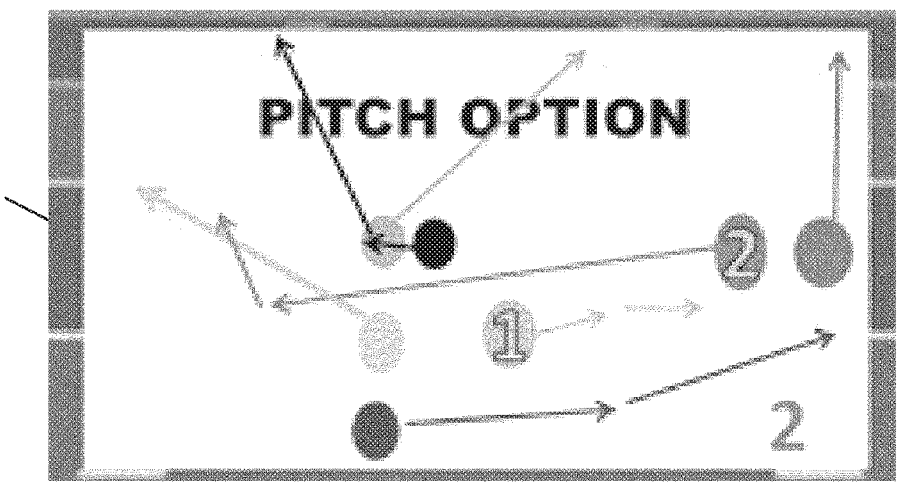

FIG. 6I illustrates an example of a selected play display screen 616. The selected play display screen 616 can display an image corresponding to a play selected by a coach or other user. The selected play display screen 616 may be displayed by the primary system 204, a secondary system 210, or a referee system 212 to illustrate the play selected by the coach. Alternatively, or in addition, the selected play display screen 616 may be presented at the wearable device 202 to display an image of the selected play to the player user wearing the wearable device 202.

Figure 6J:
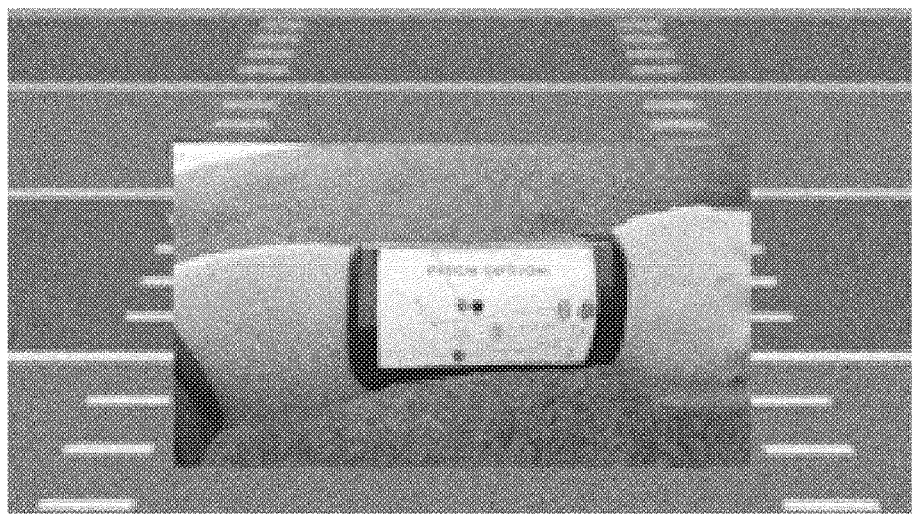

FIG. 6J illustrates an example wearable device 202 worn by a player user. As illustrated in FIG. 6J, the wearable device 202 may be worn around the wrist or arm of the player user and may display an image of the play selected by the coach user on the primary system 204. Further, the wearable device 202 may be flexible enabling the wearable device 202 to wraparound the user's arm. To increase the flexibility of the wearable device 202, the circuitry of the wearable device 202 may include flex circuits and/or a flexible screen.

Additional Embodiments

As previously described, the sports play communication system 200 enables one user, such as a coach, to select one or more plays or actions to be performed by another user, such as a player of a sporting event. The selected plays or actions may be transmitted to a wearable device 202 of the player user. Although many of the examples described herein relate to offensive play calling, the present disclosure is not limited as such. For example, embodiments disclosed herein can be used to call plays for defense or special teams in a football game.

The sports play communication system 200 may also be used to monitor the health and safety of a player user. For example, the wearable device 202 may monitor the number of throws, or pitch, made by a baseball pitcher and the amount of force of each throw. Using the pitch count in the force of each throw, a pitching coach can determine whether a pitcher is fatigued and should be replaced by another pitcher. For example, if the average force of each throw is declined by a threshold amount, the pitching coach may determine that the pitcher is fatigued.

Further, medical personnel may also use the sports play communication system 200 to monitor the health player user. For example, a sports therapist, nurse, doctor, or other medical personnel may determine that a player has suffered a concussion based on a force measured by a head impact sensor and a change in heart rate or respiratory rate is detected by the wearable device 202. As another example, medical personnel or a trainer may determine whether a player is fatigued based on a heart rate or respiratory rate measured by sensors 316 of the wearable device 202.

The sports play communication system 200 may be used to provide timing information to a player user. For example, the wearable device 202 may display a surfer's priority during a surfing contest. Based on the priority, the surfer can determine whether they should be catching a wave for when they should catch the wave. Furthermore, the wearable device 202 can provide positioning information to help the surfer locate or prepare for the next wave. In addition, the wearable device 202 can provide scoreboard information and/or an amount of time remaining in a heat to a surfer.

In some embodiments, different wearable devices 202 may receive different messages. For example, during a football game, each player may receive a different message on his or her wearable device 202. For instance, the quarterback may receive a message with a selection of three or four plays from which to choose. Each wide receiver may receive a different message highlighting that receiver's route. A running back may receive a different message highlighting the running backs role (e.g., as a runner, a blocker, or receiver). Each offensive lineman may receive a different message highlighting a direction in which to block the defensive linemen. In some cases, each wearable device 202 may receive the same text identifying a particular play, but may receive different subtext highlighting, for example, each individual's role within the play.

In some embodiments, the physical alert system 312 may be used to communicate with the wearer of the wearable device 202. For example, the physical alert system 312 may buzz in response to a clock counting down. For instance, a shot clock in a basketball game may cause the physical alert system 312 the buzz when the shot clock is at five, two, zero, or some other value. As another example, a coach may cause the physical alert system 312 to buzz based on a direction that a player, such as a running back, should run during performance of the play. Thus, if a defender is approaching the running back's left side, the coach may cause the physical alert system 312 to buzz indicating that the running back should break to, or run towards, the right side. As another example, the physical alert system 312 may buzz or vibrate to indicate snap counts. By vibrating with the snap counts, the occurrence of false starts may be reduced.

In some embodiments, a secondary system 210 may be authorized to override a message from a primary system 204. For example, the coach may select a play using the primary system 204, may be distributed to one or more wearable devices 202. An assistant coach sitting in an elevated booth in a stadium may have a different perspective than the coach of the ground-level and may determine that the play should be modified. Using the secondary system 210 assistant coach can provide the selection of an alternative play or may message the quarterback suggesting an audible. As another example, the assistant coach may observe from the elevated booth the play that should be challenged and may message the coach suggesting that the coach initiate a challenge of the previous play. In this previous example, the communication may be between the secondary system 210 and the primary system 204.

In certain embodiments, the wearable device 202 may be preprogrammed with a route. If a sailor or a surfer is beginning to leave the programed route, the wearable device 202 may alert the user using the physical alert system 312.

In some embodiments, the sports play communication system 200 may include a dock. The dock may include a storage system for storing the wearable devices 202. Further, the dock may be used to charge the wearable devices 202. In some embodiments, the dock may also include wireless communication hardware, such as a router, that can be used to establish a network between the wearable devices 202 and other computing systems of the sports play communication system 200. Thus, in certain embodiments, the combination of the dock, the primary system 204, and the wearable devices 202 may form a private ad hoc network.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The term "coupled" is used to refer to the connection between two elements, the term refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the inventions are not intended to be exhaustive or to limit the inventions to the precise form disclosed above. While specific embodiments of, and examples for, the inventions are described above for illustrative purposes, various equivalent modifications are possible within the scope of the inventions, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the inventions provided herein can be applied to other systems, not necessarily the system described above. The elements and acts of the various embodiments described above can be combined to provide further embodiments.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A system configured to provide multi-tiered communication with a network of wearable communication devices worn by player users during a live sporting event, the system comprising:
   a primary computing node configured to receive from a coach user a selection of an action from a plurality of actions to be performed during a live sporting event by one or more player users; and
   a plurality of wearable communication devices worn by a plurality of player users participating in a live sporting event, wherein each of the plurality of wearable communication devices comprises:
      a transceiver configured to receive a message generated by the primary computing node associated with the coach user at least partially instructing the plurality of player users with respect to actions to be performed during the live sporting event, the message including an image representative of the action, wherein the primary computing node transmits the message to at least one of the plurality of wearable communication devices;
      a vibration circuit that provides a physical alert to the player user in response to receipt of the message corresponding to the action; and
      a display for displaying the image representative of the action to be performed during the live sporting event by a player user from the plurality of player users participating in the live sporting event, wherein the message comprises a number of selectable options that are selectable by a player user on a corresponding wearable communication device from the plurality of wearable communication devices by interacting with a user interface of the corresponding wearable communication device.

2. The system of claim 1, wherein the action corresponds to a play from a set of available plays to be performed by the player users during the live sporting event.

3. The system of claim 1, wherein the vibration circuit is further configured to provide a physical alert to the player user to signal timing information during the live sporting event.

4. The system of claim 1, wherein a wearable communication device from the plurality of wearable communication devices transmits an acknowledgement packet to the primary computing node in response to a corresponding player user interacting with a user interface of the wearable communication device to indicate acknowledgement of the message corresponding to the action.

5. The system of claim 1, wherein the plurality of wearable communication devices form a secure mesh network configured to interact with the primary computing node.

6. The system of claim 1, wherein, in response to receiving the message generated by the primary computing node, a first wearable communication device from the plurality of wearable communication devices transmits the message to a second wearable communication device from the plurality of wearable communication devices.

7. A system configured to provide multi-tiered communication with a network of wearable communication devices worn by player users during a live sporting event, the system comprising:
   a primary computing node configured to receive from a coach user a selection of an action from a plurality of actions to be performed during a live sporting event by one or more player users;
   a plurality of wearable communication devices worn by a plurality of player users participating in a live sporting event, wherein each of the plurality of wearable communication devices comprises:
      a transceiver configured to receive a message generated by the primary computing node associated with the coach user at least partially instructing the plurality of player users with respect to actions to be performed during the live sporting event, the message including an image representative of the action, wherein the primary computing node transmits the message to at least one of the plurality of wearable communication devices;
a vibration circuit that provides a physical alert to the player user in response to receipt of the message corresponding to the action; and
a display for displaying the image representative of the action to be performed during the live sporting event by a player user from the plurality of player users participating in the live sporting event; and
an override device associated with a referee user, the override device configured to prevent the primary computing node from communicating with the plurality of wearable communication devices in response to a selection of a disconnect option enabling the referee user to prevent the coach user from communicating with the player users.

8. The system of claim 1, wherein the live sporting event includes one of a practice sporting event or a competitive sporting event.

9. The system of claim 1, wherein the plurality of wearable communication devices are configured to form an ad-hoc network.

10. The system of claim 1, wherein the primary computing node is configured to transmit authorization to perform one or more delegated actions to one or more secondary computing nodes configured to interact with at least one of the plurality of wearable communication devices.

11. The system of claim 1, further comprising a device dock configured to communicate with the plurality of wearable communication devices.

12. A system configured to provide multi-tiered communication with a network of wearable communication devices worn by player users during a live sporting event, the system comprising:
a primary computing node configured to receive from a coach user a selection of an action from a plurality of actions to be performed during a live sporting event by one or more player users;
a plurality of wearable communication devices worn by a plurality of player users participating in a live sporting event, wherein each of the plurality of wearable communication devices comprises:
a transceiver configured to receive a message generated by the primary computing node associated with the coach user at least partially instructing the plurality of player users with respect to actions to be performed during the live sporting event, the message including an image representative of the action, wherein the primary computing node transmits the message to at least one of the plurality of wearable communication devices;
a vibration circuit that provides a physical alert to the player user in response to receipt of the message corresponding to the action; and
a display for displaying the image representative of the action to be performed during the live sporting event by a player user from the plurality of player users participating in the live sporting event; and
a device dock configured to communicate with the plurality of wearable communication devices, wherein the device dock is further configured to charge the plurality of wearable devices.

13. A system configured to provide multi-tiered communication with a network of wearable communication devices worn by player users during a live sporting event, the system comprising:
a primary computing node configured to receive from a coach user a selection of an action from a plurality of actions to be performed during a live sporting event by one or more player users;
a plurality of wearable communication devices worn by a plurality of player users participating in a live sporting event, wherein each of the plurality of wearable communication devices comprises:
a transceiver configured to receive a message generated by the primary computing node associated with the coach user at least partially instructing the plurality of player users with respect to actions to be performed during the live sporting event, the message including an image representative of the action, wherein the primary computing node transmits the message to at least one of the plurality of wearable communication devices;
a vibration circuit that provides a physical alert to the player user in response to receipt of the message corresponding to the action; and
a display for displaying the image representative of the action to be performed during the live sporting event by a player user from the plurality of player users participating in the live sporting event; and
a device dock configured to communicate with the plurality of wearable communication devices, wherein the device dock comprises a secure router configured to communicate wirelessly with the plurality of wearable communication devices.

14. A system configured to provide multi-tiered communication with a network of wearable communication devices worn by player users during a live sporting event, the system comprising:
a primary computing node configured to receive from a coach user a selection of an action from a plurality of actions to be performed during a live sporting event by one or more player users;
a plurality of wearable communication devices worn by a plurality of player users participating in a live sporting event, wherein each of the plurality of wearable communication devices comprises:
a transceiver configured to receive a message generated by the primary computing node associated with the coach user at least partially instructing the plurality of player users with respect to actions to be performed during the live sporting event, the message including an image representative of the action, wherein the primary computing node transmits the message to at least one of the plurality of wearable communication devices;
a vibration circuit that provides a physical alert to the player user in response to receipt of the message corresponding to the action; and
a display for displaying the image representative of the action to be performed during the live sporting event by a player user from the plurality of player users participating in the live sporting event; and
a device dock configured to communicate with the plurality of wearable communication devices, wherein the device dock is further configured to program a wearable communication device from the plurality of wearable communication devices.

15. A system configured to provide multi-tiered communication with a network of wearable communication devices worn by player users during a live sporting event, the system comprising:

a primary computing node configured to receive from a coach user a selection of an action from a plurality of actions to be performed during a live sporting event by one or more player users;

a plurality of wearable communication devices worn by a plurality of player users participating in a live sporting event, wherein each of the plurality of wearable communication devices comprises:

a transceiver configured to receive a message generated by the primary computing node associated with the coach user at least partially instructing the plurality of player users with respect to actions to be performed during the live sporting event, the message including an image representative of the action, wherein the primary computing node transmits the message to at least one of the plurality of wearable communication devices;

a vibration circuit that provides a physical alert to the player user in response to receipt of the message corresponding to the action; and a display for displaying the image representative of the action to be performed during the live sporting event by a player user from the plurality of player users participating in the live sporting event; and a referee wearable communication device configured to:

receive a referee version of the message generated by the primary computing node, the referee version of the message including the image representative of the action; and display the image to a referee user wearing the referee wearable communication device.

16. The system of claim 15, wherein the referee version of the message at least partially differs from the message.

17. The system of claim 1, wherein each of the plurality of wearable communication devices further comprise a set of health monitoring sensors for monitoring health metrics of the player wearing the wearable communication device.

18. A system configured to provide multi-tiered communication with a network of wearable communication devices worn by player users during a live sporting event, the system comprising:

a primary computing node configured to receive from a coach user a selection of an action from a plurality of actions to be performed during a live sporting event by one or more player users; and a plurality of wearable communication devices worn by a plurality of player users participating in a live sporting event, wherein each of the plurality of wearable communication devices comprises:

a transceiver configured to receive a message generated by the primary computing node associated with the coach user at least partially instructing the plurality of player users with respect to actions to be performed during the live sporting event, the message including an image representative of the action, wherein the primary computing node transmits the message to at least one of the plurality of wearable communication devices;

a vibration circuit that provides a physical alert to the player user in response to receipt of the message corresponding to the action; and a display for displaying the image representative of the action to be performed during the live sporting event by a player user from the plurality of player users participating in the live sporting event, wherein at least one of the plurality of wearable communication devices receives a different message including additional information corresponding to the action.

19. The system of claim 18, wherein the additional information differentiates a role within the action of one player user from another player user.

* * * * *

UNITED STATES PATENT AND TRADEMARK OFFICE
CERTIFICATE OF CORRECTION

PATENT NO. : 10,532,266 B2
APPLICATION NO. : 16/058659
DATED : January 14, 2020
INVENTOR(S) : Genova et al.

It is certified that error appears in the above-identified patent and that said Letters Patent is hereby corrected as shown below:

On the Title Page

Item (12):
"Genova" should read -- Genova, et al. --.

Item (72) Inventor is corrected to read:
-- Joe Anthony Genova, Huntington Beach (CA);
Dana Christine Genova, Huntington Beach (CA) --.

Signed and Sealed this
Twenty-ninth Day of December, 2020

Andrei Iancu
*Director of the United States Patent and Trademark Office*